(12) United States Patent
Imagaki et al.

(10) Patent No.: US 9,714,048 B2
(45) Date of Patent: Jul. 25, 2017

(54) STEERING DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Susumu Imagaki, Tondabayashi (JP); Atsushi Tano, Sakurai (JP); Kentaro Kikuiri, Kashihara (JP); Shunsuke Nunomura, Kashihara (JP); Yuuji Ishii, Shiki-gun (JP); Hiroshi Kawakami, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/131,820

(22) Filed: Apr. 18, 2016

(65) Prior Publication Data

US 2016/0311460 A1 Oct. 27, 2016

(30) Foreign Application Priority Data

Apr. 21, 2015 (JP) ................................ 2015-086923

(51) Int. Cl.
*B62D 1/187* (2006.01)
*B62D 1/184* (2006.01)

(52) U.S. Cl.
CPC ............. *B62D 1/187* (2013.01); *B62D 1/184* (2013.01)

(58) Field of Classification Search
CPC ................................. B62D 1/187; B62D 1/184
See application file for complete search history.

(56) References Cited

U.S. PATENT DOCUMENTS

| 8,505,408 B2 * | 8/2013 | Havlicek | ............... B62D 1/184 280/775 |
| 2002/0171235 A1 * | 11/2002 | Riefe | ..................... B62D 1/195 280/775 |
| 2003/0057694 A1 * | 3/2003 | Manwaring | ............ B62D 1/195 280/775 |
| 2008/0196536 A1 | 8/2008 | Manwaring et al. | |

(Continued)

FOREIGN PATENT DOCUMENTS

| JP | 2008-307959 A | 12/2008 |
| JP | 2014-213691 A | 11/2014 |

OTHER PUBLICATIONS

Sep. 21, 2016 Extended European Search report issued in Patent Application No. EP16166242.4.

*Primary Examiner* — James A English
(74) *Attorney, Agent, or Firm* — Oliff PLC (57) ABSTRACT

A fastening mechanism fastens a first side plate to a second side plate by a fastening member. A boss with a rhombic cross-section of the fastening member is inserted into a telescopic-adjust long groove of the second side plate. An outer periphery of the boss includes a first corner part and a third corner part each forming an obtuse angle and facing each other. The first corner part is disposed on an upper side in an axial direction, on a lower side in a tilt direction, while the third corner part is disposed on a lower side in the axial direction, on an upper side in the tilt direction. A width across the first corner part and the third corner part is shorter than a groove width W of the telescopic-adjust long groove.

2 Claims, 5 Drawing Sheets (56) References Cited

U.S. PATENT DOCUMENTS

| | | | |
|---|---|---|---|
| 2008/0202276 A1* | 8/2008 | Harris | B62D 1/187 74/493 |
| 2009/0205458 A1* | 8/2009 | Clark | B62D 1/16 74/493 |
| 2010/0301593 A1 | 12/2010 | Sakata | |
| 2016/0144884 A1* | 5/2016 | Butler | B62D 1/187 74/495 |
| 2016/0144886 A1* | 5/2016 | Tomiyama | B62D 1/187 74/493 |

* cited by examiner

STEERING DEVICE

INCORPORATION BY REFERENCE

The disclosure of Japanese Patent Application No. 2015-086923 filed on Apr. 21, 2015 including the specification, drawings and abstract is incorporated herein by reference in its entirety.

BACKGROUND OF THE INVENTION

1. Field of the Invention

The present invention relates to a steering device.

2. Description of Related Art

There has been proposed a steering device that, with a lock mechanism (fastening mechanism) unlocked by an operating lever, allows tilt adjustment of adjusting the position of a steering wheel by tilting a steering column and telescopic adjustment of adjusting the position of the steering wheel by sliding a movable jacket of the steering column in the axial direction (e.g., see Japanese Patent Application Publication No. 2014-213691).

The fastening mechanism has a first cam, which is integrally rotatable with the operating lever, and a second cam, which is not rotatable but is movable in the axial direction, both disposed on a fastening shaft, and includes a motion conversion mechanism that is able to change the axial dimension of both cams as a whole. When the first cam is rotated by the operation of the operating lever, the second cam is moved in the axial direction and fastens a vehicle body mounting bracket to a column fixing bracket. As a result, lock is achieved.

A boss of the second cam has a rhombic cross-section (see JP 2014-213691 A) or a rectangular cross-section (see Japanese Patent Application Publication No. 2008-307959). During tilt adjustment, one pair of opposite flat parts of the outer periphery of the boss slide inside a tilt-adjust long groove provided in the vehicle body mounting bracket. During telescopic adjustment, the other pair of opposite flat parts of the outer periphery of the boss slide inside a telescopic-adjust long groove provided in the column fixing bracket.

However, when telescopic adjustment is made to extend a steering shaft (pull the steering wheel) with the lock mechanism unlocked, the boss of the second cam may rotate due to friction with the upper edge of the telescopic-adjust long groove and get caught by sticking like a wedge in the telescopic-adjust long groove. In that case, telescopic adjustment for extending the steering shaft requires a larger operating force, and can no longer be made smoothly.

SUMMARY OF THE INVENTION

Therefore, the present invention provides a steering device that allows smooth telescopic adjustment toward the extension side.

An aspect of the invention is a steering device including: a steering shaft, a column jacket, a first bracket, a second bracket; and a fastening mechanism. The steering shaft has one end thereof coupled to a steering member and is extendable and contractable in an axial direction. The column jacket includes a lower jacket and an upper jacket fitted together to be slidable relative to each other in the axial direction. The steering shaft is rotatably supported by the column jacket. The first bracket includes a pair of first side plates each having a tilt-adjust long groove formed therein, and is fixed on a vehicle body The second bracket includes a pair of second side plates respectively facing the first side plates and each having a telescopic-adjust long groove formed therein, and is fixed on the upper jacket. The fastening mechanism includes: a first fastening member and a second fastening member each having a fastening plate facing the corresponding first side plate on the opposite side of the corresponding first side plate from the corresponding second side plate, a boss with a rhombic cross-section that protrudes from a first side plate-side surface of the fastening plate and is inserted into the tilt-adjust long groove of the corresponding first side plate and the telescopic-adjust long groove of the corresponding second side plate, and a fastening shaft insert hole passing through the fastening plate and the boss; and a fastening shaft inserted into the fastening shaft insert holes. The fastening mechanism presses the fastening plates against the corresponding first side plates to fasten the corresponding first side plates to the corresponding second side plates. An outer periphery of the boss of at least one of the first fastening member and the second fastening member includes a first corner part and a third corner part each forming an obtuse angle and facing each other, and a second corner part and a fourth corner part each forming an acute angle and facing each other. The first corner part is disposed on a steering member side in the axial direction, on a lower side in a tilt direction, while the third corner part is disposed on a side opposite from the steering member side in the axial direction, on an upper side in the tilt direction. A width across the first corner part and the third corner part is shorter than a groove width of the telescopic-adjust long groove in a direction orthogonal to the longitudinal direction of the telescopic-adjust long groove.

In the aspect of the invention, the width across the first corner part and the third corner part of the boss of at least one fastening member is shorter than the groove width of the telescopic-adjust long groove. Accordingly, during telescopic adjustment in the extension direction, even if the boss of the at least one fastening member rotates around the fastening shaft by being subjected to frictional resistance from the upper edge of the telescopic-adjust long groove while sliding inside the telescopic-adjust long groove, the first corner part and the third corner part do not catch on the upper and lower edges of the telescopic-adjust long groove. Thus, telescopic adjustment in the extension direction can be made easily.

In the steering device according to the above aspect, in the boss of at least one of the first fastening member and the second fastening member, the first corner part and the third corner part may form a part of a cylindrical surface concentric with the fastening shaft insert hole.

In the above structure, even if the boss rotates around the fastening shaft during telescopic adjustment in the extension direction, the radii of the rotation loci of the first corner part and the third corner part remain the same. Thus, it is possible to reliably prevent the first corner part and the third corner part from catching on the upper and lower edges of the telescopic-adjust long groove.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
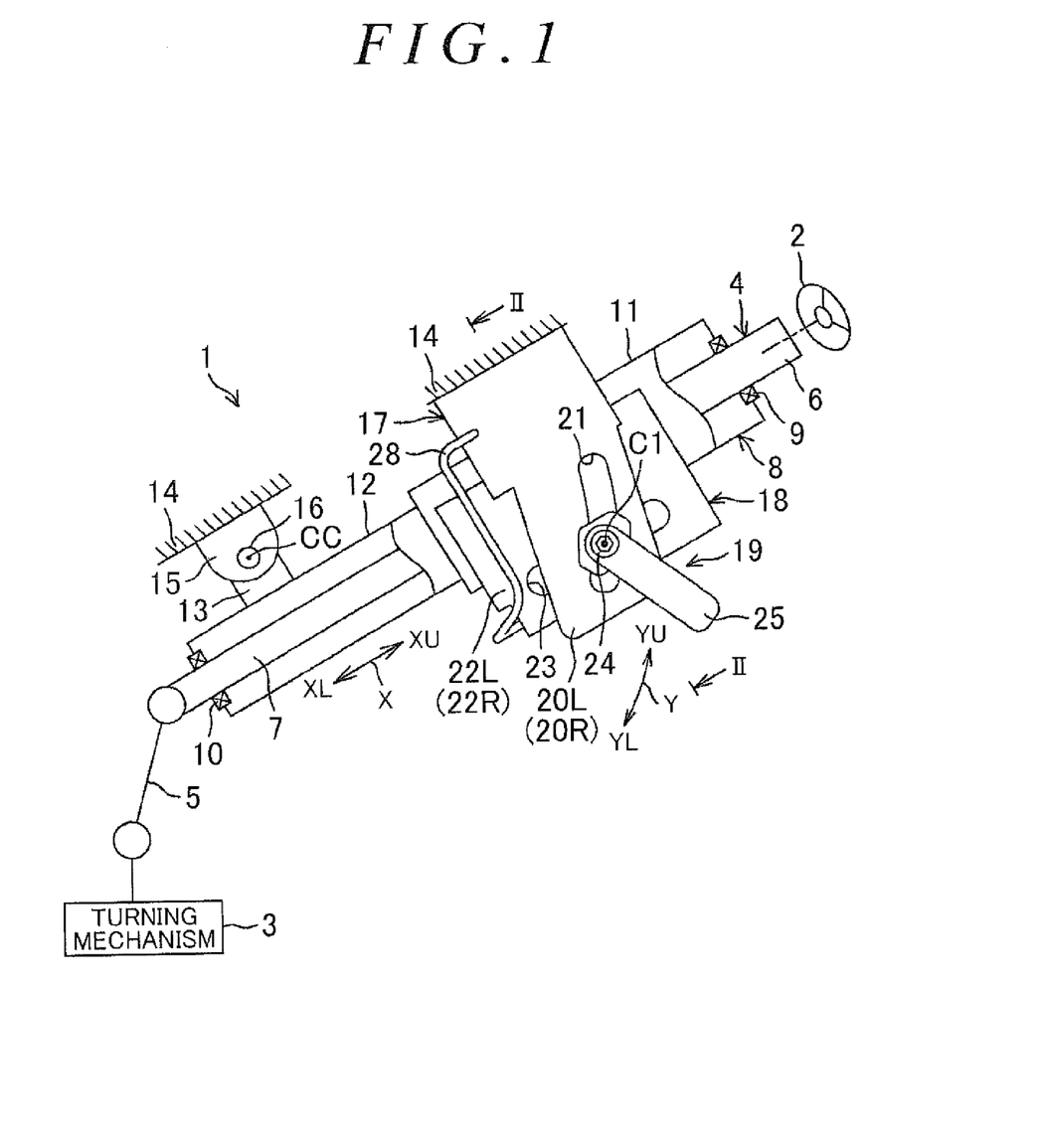
FIG. 1 is a schematic side view of the general configuration of a steering device of one embodiment of the present invention;
}

An embodiment of the present invention will be described with reference to the accompanying drawings. FIG. 1 is a schematic view showing the general configuration of a steering device of one embodiment of the present invention. Referring to FIG. 1, a steering device 1 includes a steering member 2, such as a steering wheel, and a turning mechanism 3 that turns a turning wheel (not shown) in conjunction with the steering of the steering member 2. For example, a rack-and-pinion mechanism is used as the turning mechanism 3.

The steering device 1 further includes a steering shaft 4 having one end thereof coupled to the steering member 2, and an intermediate shaft 5 interposed between the steering shaft 4 and the turning mechanism 3. The turn of the steering member 2 is transmitted to the turning mechanism 3 through the steering shaft 4, the intermediate shaft 5, etc. The turn having been transmitted to the turning mechanism 3 is converted into the axial movement of a rack shaft (not shown). As a result, the turning wheel is turned.

The steering shaft 4 includes a tubular upper shaft 6 and a lower shaft 7 that are fitted together by, for example, spline fitting or serration fitting, to be slidable relative to each other in an axial direction X. The steering member 2 is coupled to one end of the upper shaft 6. The steering shaft 4 is extendable and contractable in the axial direction X. The steering device 1 further includes a tubular column jacket 8 having the steering shaft 4 inserted therein. The column jacket 8 supports the steering shaft 4 through a plurality of bearings 9, 10 so that the steering shaft 4 is rotatable.

The column jacket 8 includes an upper jacket 11 on the outer side and a lower jacket 12 on the inner side that are fitted together to be slidable relative to each other in the axial direction X. The column jacket 8 is extendable and contractable in the axial direction X. The upper jacket 11 rotatably supports the upper shaft 6 through the bearing 9. The upper jacket 11 is coupled to the upper shaft 6 through the bearing 9 to be movable in the axial direction X of the steering shaft 4 along with the upper shaft 6.

A column bracket 13 is fixed to the outer periphery of the lower jacket 12. The column bracket 13 is pivotally supported through a tilt spindle 16 on a support bracket 15 that is fixed on a vehicle body 14. Thus, the column jacket 8 and the steering shaft 4 can pivot (tilt) around a tilt center CC that is the central axis of the tilt spindle 16.

Pivoting (tilting) the steering shaft 4 and the column jacket 8 around the tilt center CC as the supporting point can adjust the position of the steering member 2 in a tilt direction Y (so-called tilt adjustment). Extending or contracting the steering shaft 4 and the column jacket 8 in the axial direction X adjusts the position of the steering member 2 in the axial direction X (corresponding to a telescopic direction) (so-called telescopic adjustment).

The steering device 1 further includes a first bracket 17 supported on the vehicle body 14, a second bracket 18 fixed on the upper jacket 11, and a fastening mechanism 19 that achieves tilt lock and telescopic lock. The first bracket 17 is supported through a publicly-known detaching mechanism (not shown) (e.g., capsule mechanism) to be detachable from the vehicle body 14 in the axial direction X in the event of secondary collision. The first bracket 17 includes a pair of first side plates 20L, 20R (only the first side plate 20L is shown in FIG. 1). A tilt-adjust long groove 21 extending in the tilt direction Y is formed in each of the first side plates 20L, 20R.

The second bracket 18 has a pair of second side plates 22L, 22R (only the left second side plate 22L is shown in FIG. 1) that are placed along the inner side of the pair of first side plates 20L, 20R. A telescopic-adjust long groove 23 extending in the telescopic direction (axial direction X) is formed in each of the second side plates 22L, 22R. The fastening mechanism 19 achieves tilt lock and telescopic lock by fastening together the first side plates 20L, 20R and the corresponding second side plates 22L, 22R. The fastening mechanism 19 includes: a force conversion mechanism 30 having a fastening shaft 24, an operating lever 25, a rotating cam 31, and a non-rotating cam (first fastening member 32); a nut 33; a second fastening member 34; and an interposed member 35.

Figure 2:
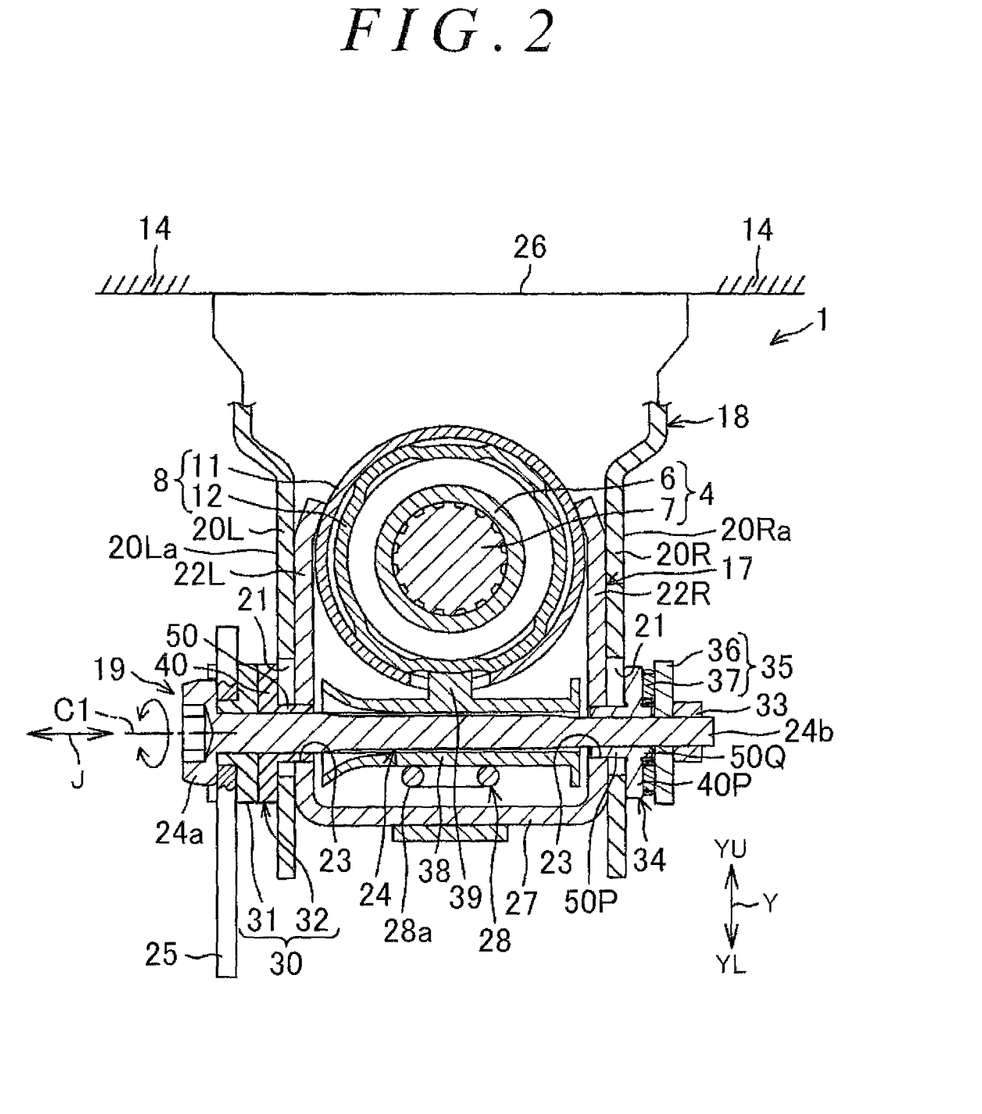
FIG. 2 is a sectional view of the major part of the steering device of FIG. 1, and corresponds to a sectional view along the line II-II of FIG. 1.

The fastening shaft 24 is inserted into the tilt-adjust long grooves 21 and the telescopic-adjust long grooves 23. The operating lever 25 can pivot integrally with the fastening shaft 24. The operating lever 25 can pivot around a central axis C1 of the fastening shaft 24 through the manual operation of a driver. Referring to FIG. 2, the first bracket 17 includes a top plate 26 detachably supported on the vehicle body 14 through a detaching mechanism (not shown), and the pair of first side plates 20L, 20R extending respectively from both ends of the top plate 26 toward a lower side YL in the tilt direction Y.

The second bracket 18 forms a U-shape with the pair of second side plates 22L, 22R respectively facing the pair of first side plates 20L, 20R of the first bracket 17, and a coupling plate 27 that couples together the lower ends in the tilt direction Y of the pair of second side plates 22L, 22R. The fastening shaft 24 is a bolt that is inserted into the tilt-adjust long grooves 21 of the pair of first side plates 20L, 20R and the telescopic-adjust long grooves 23 of the pair of second side plates 22L, 22R. A large-diameter head 24a provided at one end of the fastening shaft 24 is fixed on the operating lever 25 to be rotatable integrally with the operating lever 25.

The force conversion mechanism 30 is interposed between the head 24a of the fastening shaft 24 and the left first side plate 20L. The force conversion mechanism 30 converts the operating torque of the operating lever 25 into the axial force of the fastening shaft 24 (fastening force for fastening the pair of first side plates 20L, 20R). The force conversion mechanism 30 includes the rotating cam 31 and the first fastening member 32 that is the non-rotating cam. The rotating cam 31 is coupled to the operating lever 25 to be rotatable integrally with the operating lever 25. The movement of the rotating cam 31 is restricted relative to the fastening shaft 24 in a fastening shaft axial direction J that is the direction of the central axis of the fastening shaft 24.

The first fastening member 32 (non-rotating cam) engages with the rotating cam 31 to fasten the left first side plate 20L.

The nut 33 is screwed on a thread part 24b at the other end of the fastening shaft 24. The second fastening member 34 fastens the right first side plate 20R. The interposed member 35 is interposed between the second fastening member 34 and the nut 33. The interposed member 35 includes a washer 36 interposed between the nut 33 and the second fastening member 34, and a needle roller bearing 37 interposed between the washer 36 and the second fastening member 34.

The second fastening member 34 and the interposed member 35 are interposed between the nut 33 and the right first side plate 20R of the first bracket 17. The rotating cam 31, the first fastening member 32 (non-rotating cam), the second fastening member 34, and the interposed member 35 are supported on the outer periphery of the fastening shaft 24. The first fastening member 32 (non-rotating cam) includes a fastening plate 40 and a boss 50. The first fastening member 32 has a fastening shaft insert hole 42 formed therein that is a circular hole passes through the boss 50 and the fastening plate 40. The fastening plate 40 of the first fastening member 32 faces the left first side plate 20L on the opposite side of the first side plate 20L from the left second side plate 22L.

Figure 3A:
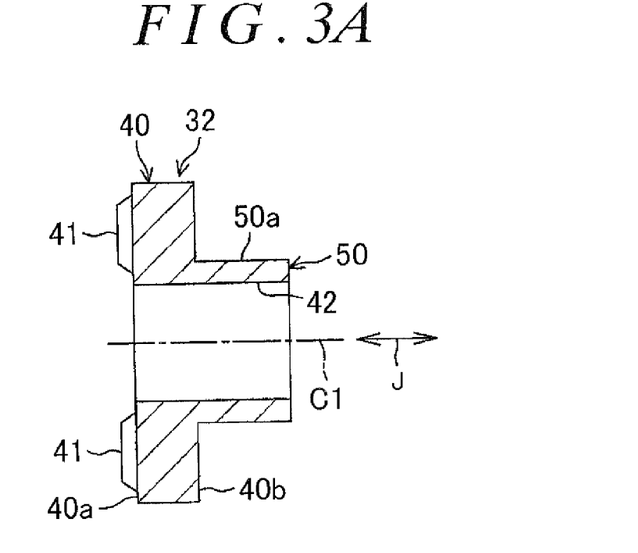
FIG. 3A is a sectional view of one fastening member.
Figure 3B:
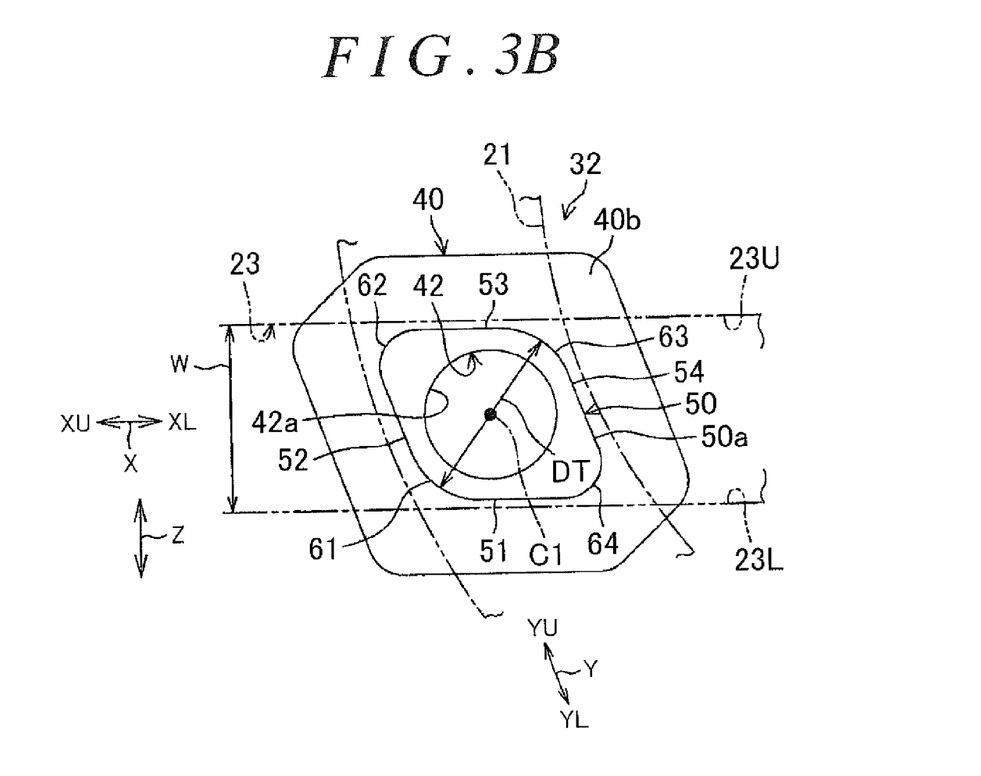
FIG. 3B is a rear view of the one fastening member as seen from the side of a boss.

The fastening plate 40 presses the left first side plate 20L. The boss 50 is inserted into the tilt-adjust long groove 21 of the left first side plate 20L and the telescopic-adjust long groove 23 of the left second side plate 22L. As shown in FIG. 3A and FIG. 3B, the fastening plate 40 of the first fastening member 32 includes a first surface 40a with a cam protrusion 41 formed therein and a second surface 40b on the opposite side from the first surface 40a. The second surface 40b is formed as a flat surface that presses an outer surface 20La of the left first side plate 20L (see FIG. 2). As shown in FIG. 3A, the boss 50 protrudes from the second surface 40b (corresponding to the surface of the fastening plate 40 on the side of the first side plate 20L).

As shown in FIG. 3B, the boss 50 has a rhombic cross-section. An outer periphery 50a of the boss 50 includes, as the four sides of the rhombus, a first flat part 51, a second flat part 52, a third flat part 53, and a fourth flat part 54. The first flat part 51 and the third flat part 53 are sliding surfaces that slide inside the telescopic-adjust long groove 23. The second flat part 52 and the fourth flat part 54 are sliding surfaces that slide inside the tilt-adjust long groove 21.

The outer periphery 50a of the boss 50 further includes a first corner part 61, a second corner part 62, a third corner part 63, and a fourth corner part 64. In FIG. 3B, the first corner part 61, the second corner part 62, the third corner part 63, and the fourth corner part 64 are disposed clockwise in this order. The first corner part 61 is formed between the first flat part 51 and the second flat part 52. The second corner part 62 is formed between the second flat part 52 and the third flat part 53. The third corner part 63 is formed between the third flat part 53 and the fourth flat part 54. The fourth corner part 64 is formed between the fourth flat part 54 and the first flat part 51.

The first corner part 61 and the third corner part 63 each form an obtuse angle and face diagonally each other. The second corner part 62 and the fourth corner part 64 each form an acute angle and face diagonally each other. The first corner part 61 is disposed on an upper side XU (the side of the steering member 2) in the axial direction X, on the lower side YL in the tilt direction Y. The third corner part 63 is disposed on a lower side XL (the opposite side from the steering member 2) in the axial direction X, on an upper side YU in the tilt direction Y.

A width DT across the first corner part 61 and the third corner part 63 is shorter than a groove width W of the telescopic-adjust long groove 23 in a direction Z that is orthogonal to the longitudinal direction of the telescopic-adjust long groove 23 (DT<W). The first corner part 61 and the third corner part 63 form a part of a cylindrical surface concentric with the fastening shaft insert hole 42. That is, the cylindrical surface formed by an inner periphery 42a of the fastening shaft insert hole 42 and the part of the cylindrical surface formed by the first corner part 61 and the third corner part 63 have the same center (corresponding to the central axis C1).

Figure 4A:
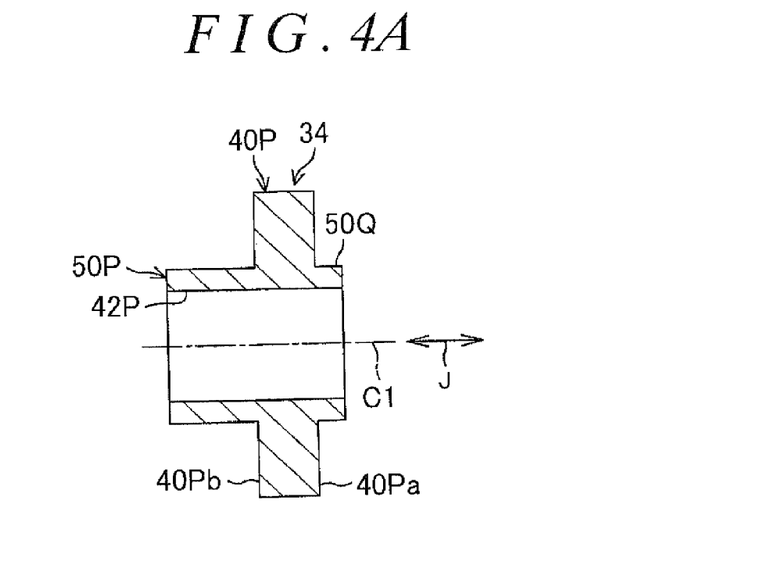
FIG. 4A is a sectional view of the other fastening member.
Figure 4B:
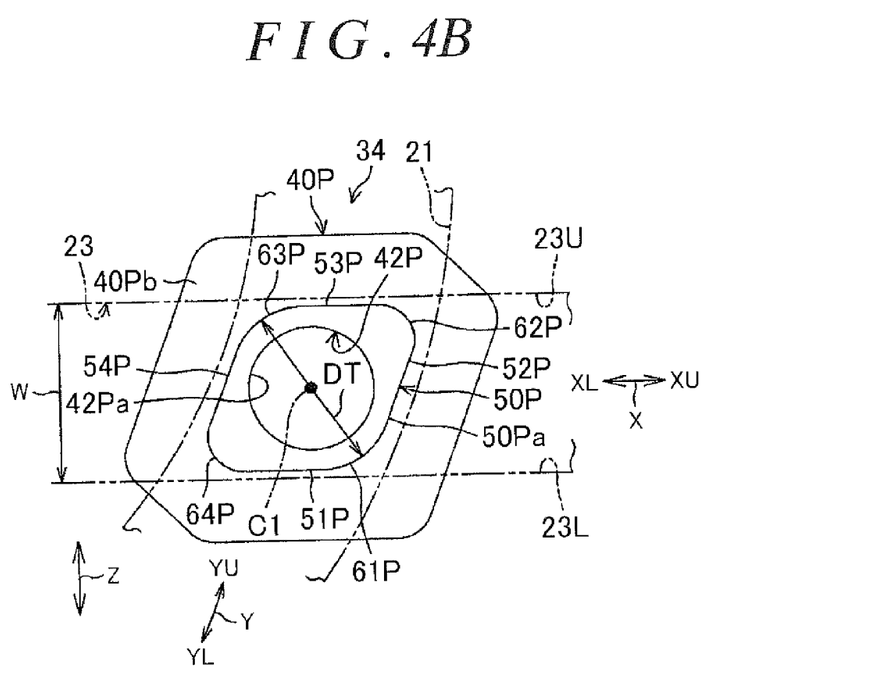
FIG. 4B is a rear view of the other fastening member as seen from the side of a boss.

As shown in FIG. 4A and FIG. 4B, the second fastening member 34 has a shape laterally symmetrical to the first fastening member 32 shown in FIG. 3A and FIG. 3B, but has no cam protrusion. Those components of the second fastening member 34 that correspond to the components of the first fastening member 32 are given the suffix letter P. The second fastening member 34 includes a fastening plate 40P, a boss 50P, and a boss 50Q. The second fastening member 34 has a fastening shaft insert hole 42P formed therein that is a circular hole penetrating the fastening plate 40P and the boss 50P. The fastening plate 40P of the second fastening member 34 faces the right first side plate 20R from the opposite side from the right second side plate 22R.

The fastening plate 40P includes a first surface 40Pa and a second surface 40Pb. The first surface 40Pa and the second surface 40Pb are formed as flat surfaces. The second surface 40Pb presses an outer surface 20Ra of the right first side plate 20R (see FIG. 2). As shown in FIG. 4A, the boss 50P protrudes from the second surface 40Pb (corresponding to the surface of the fastening plate 40P on the side of the first side plate 20R). The boss 50Q protrudes cylindrically from the first surface 40Pa. The boss 50Q is disposed on the radially inner side from the needle roller bearing 37 of FIG. 2.

The boss 50P is inserted into the tilt-adjust long groove 21 of the right first side plate 20R and the telescopic-adjust long groove 23 of the right second side plate 22R. As shown in FIG. 4B, an outer periphery 50Pa of the boss 50P includes a first corner part 61P, a second corner part 62P, a third corner part 63P, and a fourth corner part 64P. The first corner part 61P, the second corner part 62P, the third corner part 63P, and the fourth corner part 64P are disposed counter-clockwise in this order. The outer periphery 50Pa of the boss 50P includes a first flat part 51P, a second flat part 52P, a third flat part 53P, and a fourth flat part 54P.

The first corner part 61P is disposed on the upper side XU (the side of the steering member 2) in the axial direction X, on the lower side YL in the tilt direction Y. The third corner part 63P is disposed on the lower side XL (the opposite side from the steering member 2) in the axial direction X, on the upper side YU in the tilt direction Y. The width DT across the first corner part 61P and the third corner part 63P is shorter than the groove width W of the telescopic-adjust long groove 23 in the direction Z orthogonal to the longitudinal direction of the telescopic-adjust long groove 23 (DT<W).

The first corner part 61P and the third corner part 63P form a part of a cylindrical surface concentric with the fastening shaft insert hole 42P. That is, the cylindrical surface formed by an inner periphery 42Pa of the fastening shaft insert hole 42P and the part of the cylindrical surface formed by the first corner part 61P and the third corner part 63P have the same center (corresponding to the central axis C1). The rotation of the bosses 50, 50P of the first fastening member 32 and the second fastening member 34 around the fastening shaft 24 is restricted by the tilt-adjust long grooves 21 of the corresponding first side plates 20L, 20R not to exceed a predetermined amount of rotation. The fastening members 32, 34 are supported on the fastening shaft 24 to be movable in the fastening shaft axial direction J.

A sleeve 38 that rotates integrally with the fastening shaft 24 is fitted by serration fitting, for example, on the outer periphery of the shank of the fastening shaft 24. A push-up cam 39 is provided on the outer periphery of the sleeve 38 to be rotatable integrally with the sleeve 38. The steering device 1 further includes an urging member 28 that functions as a so-called flip-up spring when the lock is unlocked. One end (not shown) of the urging member 28 is engaged on the first bracket 17, while the other end 28a elastically receives the sleeve 38. During tilt and/or telescopic adjustment when the fastening mechanism 19 is unfastened (tilt lock and telescopic lock are unlocked), the urging member 28 applies an urging force toward the upper side YU in the tilt direction Y to the column jacket 8 through the sleeve 38 and the fastening shaft 24 to elastically support the column jacket 8.

As the operating lever 25 is turned in the lock direction, the rotating cam 31 rotates relative to the one fastening member 32 (non-rotating cam), so that the one fastening member 32 is moved in the fastening shaft axial direction J. Thus, the pair of first side plates 20L, 20R of the first bracket 17 are clamped and fastened between the fastening members 32, 34 (the fastening plates 40, 40P thereof). As a result, the first side plates 20L, 20R of the first bracket 17 are fastened to the corresponding second side plates 22L, 22R of the second bracket 18, and tilt lock and telescopic lock are achieved. Moreover, as the push-up cam 39 pushes up the lower jacket 12, friction lock between both jackets 11, 12 is achieved.

In this embodiment, unfastening the fastening mechanism 19 to make telescopic adjustment causes the steering shaft 4, the column jacket 8, and the second bracket 18 to move downward under their own weights. Meanwhile, the urging member 28 shown in FIG. 2 elastically urges the fastening shaft 24, the first fastening member 32, and the second fastening member 34 through the sleeve 38 toward the upper side YU in the tilt direction Y.

Figure 5A:
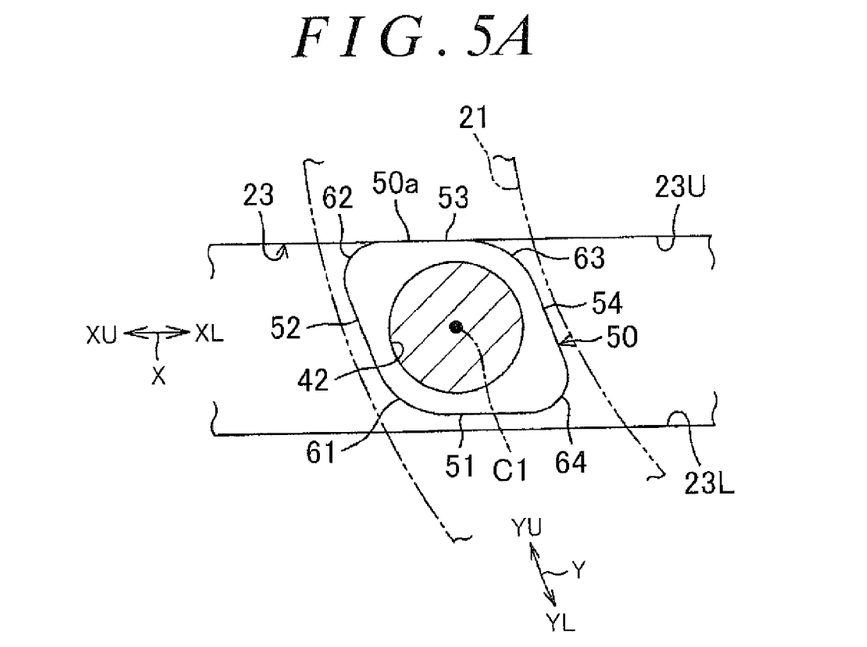
FIG. 5A is a view illustrating a state, immediately after the unfastening of a fastening mechanism, in which the boss of the one fastening member is engaged in a tilt-adjust long groove and a telescopic-adjust long groove.

Thus, as shown in FIG. 5A, on the outer periphery 50a of the boss 50 of the first fastening member 32, the third flat part 53 comes into contact with an upper edge 23U of the telescopic-adjust long groove 23, while the first flat part 51 is separated from a lower edge 23L of the telescopic-adjust long groove 23. If telescopic adjustment in the extension direction, which is the extension direction of the steering shaft 4 and the column jacket 8, is made in this state, the upper edge 23U of the telescopic-adjust long groove 23 moves relative to the boss 50 toward the upper side XU in the axial direction X. As a result, the boss 50 is subjected to a frictional resistance F from the upper edge 23U and rotates around the fastening shaft 24 (counterclockwise in FIG. 5B).

Figure 5B:
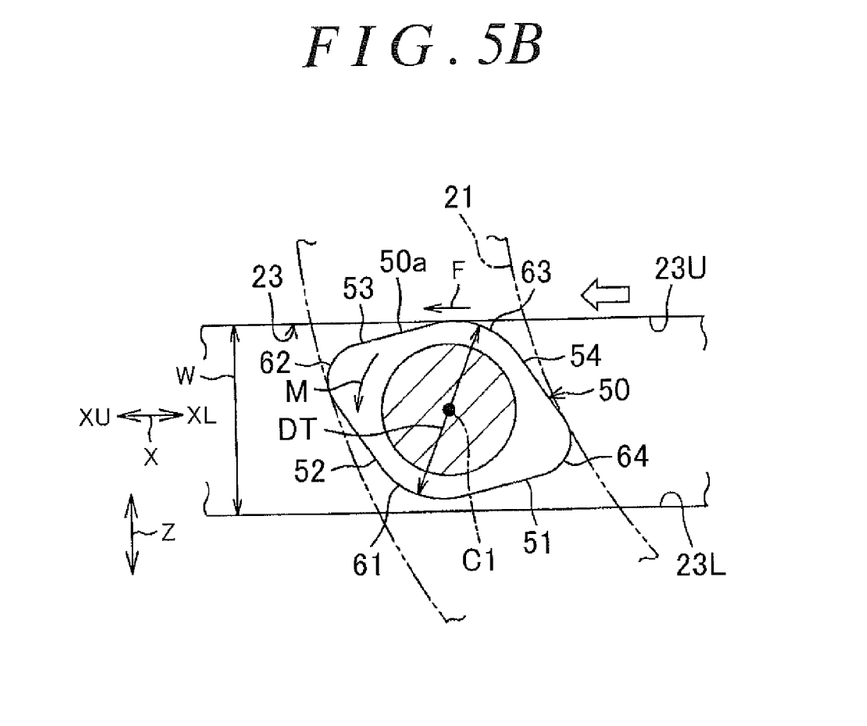
FIG. 5B is a view showing a state in which the boss has rotated during telescopic adjustment toward the extension side.

Here, the width DT across the first corner part 61 and the third corner part 63 of the boss 50 is shorter than the groove width W of the telescopic-adjust long groove 23 (DT<W). Accordingly, during telescopic adjustment in the extension direction, even if the boss 50 rotates around the fastening shaft 24 by being subjected to a moment M due to the frictional resistance F from the upper edge 23U of the telescopic-adjust long groove 23 moving toward the upper side XU in the axial direction X (telescopic direction), the first corner part 61 and the third corner part 63 of the boss 50 do not catch on the upper and lower edges 23U, 23L of the telescopic-adjust long groove 23. Therefore, telescopic adjustment in the extension direction can be made smoothly.

Thus, the operation feeling of an operator during telescopic adjustment toward the extension side is improved.

When the boss catches in the telescopic-adjust long groove during telescopic adjustment as is conventionally the case, since the catching is usually intermittent, the acute-angled second corner part or fourth corner part may cause noise by rattling in the tilt-adjust long groove of the first side plate. Moreover, when the edges of the telescopic-adjust long groove become uneven due to dent etc., the boss may cause jingling noise while sliding along the uneven edges.

In this embodiment, by contrast, since the boss 50 is prevented from catching in the telescopic-adjust long groove 23, it is possible to suppress the occurrence of rattling noise in the tilt-adjust long groove 21 as well as to suppress the occurrence of jingling noise in the telescopic-adjust long groove 23. There is no need to add other parts as measures for suppressing these noises. Moreover, in the boss 50, the first corner part 61 and the third corner part 63 form a part of a cylindrical surface concentric with the fastening shaft insert hole 42. Accordingly, even if the boss 50 rotates around the fastening shaft 24 during telescopic adjustment in the extension direction, the radii of the rotation loci of the first corner part 61 and the third corner part 63 remain the same. Thus, it is possible to reliably prevent the first corner part 61 and the third corner part 63 from catching on the upper and lower edges 23U, 23L of the telescopic-adjust long groove 23.

The relation between the boss 50P of the second fastening member 34 and the corresponding telescopic-adjust long groove 23 is the same as the relation between the boss 50 of the first fastening member 32 and the corresponding telescopic-adjust long groove 23. That is, during telescopic adjustment toward the extension side, the boss 50P of the second fastening member 34 does not catch in the corresponding telescopic-adjust long groove 23. The present invention is not limited to the above-described embodiment, and alternatively, the present invention may be applied to only one of the first fastening member 32 and the second fastening member 34. As long as the condition that the widths DT across the first corner parts 61, 61P and the third corner parts 63, 63P are shorter than the groove width W of the telescopic-adjust long groove 23 in the direction Z orthogonal to the longitudinal direction of the telescopic-adjust long groove 23 (DT<W) is satisfied, it is not absolutely necessary that the first corner parts 61, 61P and the third corner parts 63, 63P form a part of a cylindrical surface concentric with the fastening shaft insert holes 42, 42P.

What is claimed is:
1. A steering device comprising:
a steering shaft that has one end thereof coupled to a steering member and is extendable and contractable in an axial direction;
a column jacket that includes a lower jacket and an upper jacket fitted together to be slidable relative to each other in the axial direction, and by which the steering shaft is rotatably supported;
a first bracket that includes a pair of first side plates each having a tilt-adjust long groove formed therein, and is fixed on a vehicle body;
a second bracket that includes a pair of second side plates respectively facing the first side plates and each having a telescopic-adjust long groove formed therein, and is fixed on the upper jacket; and
a fastening mechanism that includes:
(a) a first fastening member and a second fastening member each having a fastening plate facing a corresponding first side plate on an opposite side of the corresponding first side plate from a corresponding second side plate, (b) a boss with a rhombic cross-section that protrudes from a first side plate-side surface of each of the fastening plates and is inserted into the tilt-adjust long groove of the corresponding first side plate and the telescopic-adjust long groove of the corresponding second side plate, and (c) a fastening shaft insert hole passing through each of the fastening plates and each of the bosses; and a fastening shaft inserted into the fastening shaft insert holes, the fastening mechanism pressing the fastening plates against the corresponding first side plates to fasten the corresponding first side plates to the corresponding second side plates, wherein an outer periphery of the boss of at least one of the first fastening member and the second fastening member includes a first corner part and a third corner part each forming an obtuse angle and facing each other, and a second corner part and a fourth corner part each forming an acute angle and facing each other, the first corner part is disposed on a steering member side in the axial direction, on a lower side in a tilt direction, while the third corner part is disposed on a side opposite from the steering member side in the axial direction, on an upper side in the tilt direction, and a width across the first corner part and the third corner part is shorter than a groove width of the telescopic-adjust long groove in a direction orthogonal to a longitudinal direction of the telescopic-adjust long groove.

2. The steering device according to claim 1, wherein, in the boss of at least one of the first fastening member and the second fastening member, the first corner part and the third corner part form a part of a cylindrical surface concentric with the fastening shaft insert hole.

* * * * *